(No Model.)
C. G. PURDY.
FILTER.
No. 427,906. Patented May 13, 1890.
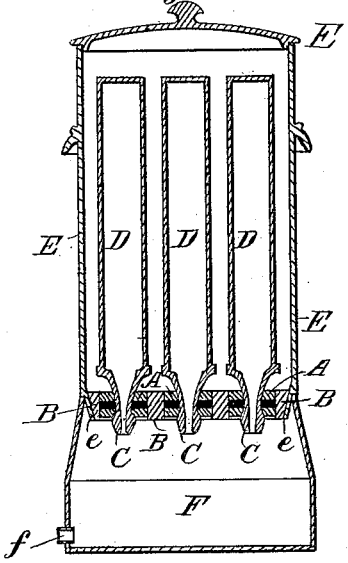
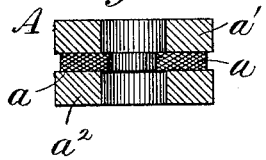
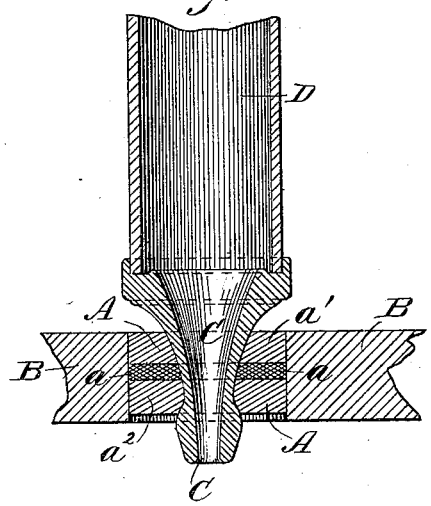
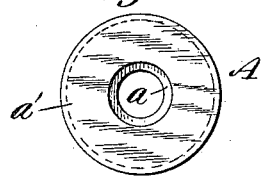
WITNESSES:
INVENTOR:
C. G. Purdy
BY
Munn & Co.
ATTORNEYS

UNITED STATES PATENT OFFICE.

CHARLES G. PURDY, OF BROOKLYN, NEW YORK.

FILTER.

SPECIFICATION forming part of Letters Patent No. 427,906, dated May 13, 1890.

Application filed December 12, 1889. Serial No. 333,456. (No model.)

*To all whom it may concern:*

Be it known that I, CHARLES G. PURDY, of Brooklyn, in the county of Kings and State of New York, have invented a new and Improved Filter, of which the following is a full, clear, and exact description.

My invention relates to water or fluid filters, and has for its object to provide an improved packing for the joint of the filter tube or tubes with the partition which separates the unfiltered and filtered fluid chambers of the filter, such packing being acid-proof, and therefore less liable than ordinary rubber packings to deteriorate the quality and spoil the flavor of acidulous filtered fluids, and also being more durable than the ordinary packings, while allowing the tube to be removed or replaced at will.

The invention will first be described, and then will be particularly pointed out in the claims.

Reference is to be had to the accompanying drawings, forming a part of this specification, in which similar letters of reference indicate corresponding parts in all the figures.

Figure 1 is a vertical sectional view of a filter, the tubes of which are supported in accordance with my invention. Fig. 2 is an enlarged sectional view of one of the tube-joint packings. Fig. 3 is a face view thereof; and Fig. 4 is an enlarged vertical sectional detail view of the filtering end of one of the filtering-tubes, and a part of the partition into which it is fitted by the improved packing.

My improvement consists in the application of a packing A of peculiar construction to the partition B of a filter, and fitting the discharge-nozzles C of the filtering-tubes D into the packings, as hereinafter more fully explained.

The body portions of the filter may have any approved form, size, or design, and may be made of stoneware, china, metal, or any other approved material or materials, provided the partition B, which sustains the filtering-tubes D, is fitted between the unfiltered-fluid chamber E and the filtered-fluid chamber F, the latter to have any suitable discharge-outlet $f$ for the filtered fluid, to which outlet will be connected a faucet of any approved form, or a pipe leading to any preferred point of discharge. The filter represented in Fig. 1 of the drawings is made with an upper chamber E, detachable from the lower chamber F, and the partition B is supported on a bottom tapering flange $e$ of the upper chamber which projects into the lower one.

It has been the common practice to support filtering-tubes of the class shown by means of rubber packings fitted into the partition separating the two chambers of a filter. When water alone is to be filtered, there is no serious objection to the use of these rubber packings; but when any liquid having a more or less strongly-acid reaction is to be filtered—such, for instance, as vinegar, unfermented grape or apple juice, or lemon extracts—the rubber packings are very objectionable, chiefly because the rubber injures the flavor of the fluid, and the fluid by its acidity quickly injures or destroys the rubber packing, so that it no longer answers its purpose.

In my improvement I avail myself of the tight-jointing qualities of rubber or other suitable elastic substance, while protecting it from the destructive influences of any acid fluid being filtered. I accomplish this in a very simple and efficient manner by providing a packing for the tube, consisting of a plate or piece of rubber or other elastic or yielding material, through which the tube-nozzle passes, and a guard or protection at the face or faces of the rubber or elastic material and fitting the tube-nozzle.

I prefer to carry out the invention in the manner represented in the drawings or by placing the packing A into a hole made in the partition B of the filter, and then fitting the tube-nozzle into the packing. This packing preferably consists of a central apertured disk or plate $a$ of rubber and two disks or plates $a$ $a^2$ of cork-wood, placed one at each side of the rubber plate $a$, said cork disks being securely cemented to the wall of the hole $b$, made in the partition B to receive them. I prefer cork-wood for the guard or protection of the rubber, as cork will yield somewhat and make a very close and reliable joint with the nozzle C of the filtering-tube; but any other suitable substance proof against deterioration by acids may be used to guard the interior rubber packing-disk and effect the two results above named, or to prevent contamination of the fluid by the rubber and obviate destruction of the rubber by the acid, and thus assure a clear, pure, filtered fluid and great durability of the filtering-tube joint with the partition which supports it, and from which the tube may rise, as in the drawings, or may hang, when the filtered-fluid chamber is above the unfiltered-fluid one, as in some styles of filters. With this construction leakage of unfiltered fluids into the filtered-fluid chamber through the joint of the tube with the partition is prevented, and the tube may be removed for cleaning or other purpose and replaced at pleasure.

It will be understood that the guard or protection plate $a'$ between the rubber packing-disk $a$ and the unfiltered-fluid chamber E of the filter is essential to protect the packing, and the guard or protection plate $a^2$ at the other face of the packing $a$ is not absolutely essential; but it is desirable in case the filtered acidulous fluid should rise to the tube-nozzle, and is also preferred, because it re-enforces the somewhat thin rubber packing $a$, which I choose to employ. The central hole through the packing-disk $a$ is somewhat smaller than the hole through its guard or protection plates $a'$ $a^2$, and said disk $a$ is also a little smaller in diameter or marginally than the guard-plates, as clearly shown in Figs. 2 and 3 of the drawings, thereby assuring room for necessary expansion of the rubber packing as the filtering-tube nozzle is forced through it to fit tightly in the packing guard-plates, while allowing the latter to form a very close face-joint with the central elastic or yielding packing. As many filtering-tubes D may be used as the size of the filter may require, the filter shown having three tubes; but one, two, or more than three tubes may be used, as will readily be understood.

Having thus described my invention, I claim as new and desire to secure by Letters Patent—

1. In a filter, the combination, with a partition separating the unfiltered and filtered fluid chambers, and a filtering-tube, of a joint for said tube consisting of a plate or piece of rubber or elastic material, through which the tube-nozzle passes, and a guard or protection at the face or faces of said rubber or elastic material and fitting the tube-nozzle, substantially as herein set forth.

2. A packing or joint for filter-tubes, consisting of a central elastic or yielding apertured disk or plate and two apertured guard or protection plates, one at each side of the elastic plate, all adapted to an opening in a partition separating the unfiltered and filtered fluid chambers of a filter, and to make a joint with the filtering-tube nozzle, substantially as herein set forth.

CHARLES G. PURDY.

Witnesses:
 HENRY L. GOODWIN,
 EDGAR TATE.